United States Patent [19]

Cooper et al.

[11] 4,099,574

[45] Jul. 11, 1978

[54] FIRE-FIGHTING COMPOSITIONS

[75] Inventors: Gerald Edward Cooper, Crowthorne; Robert Eugene Stratton, Brentford, both of England

[73] Assignee: Chubb Fire Security Limited, Sunbury-on-Thames, England

[21] Appl. No.: 784,398

[22] Filed: Apr. 4, 1977

[30] Foreign Application Priority Data

Apr. 6, 1976 [GB] United Kingdom ............... 13823/76

[51] Int. Cl.$^2$ ............................ A62C 1/02; C09K 3/28

[52] U.S. Cl. .......................................... 169/47; 252/3; 252/8.05

[58] Field of Search ...................... 252/3, 8.05; 169/47

[56] References Cited

U.S. PATENT DOCUMENTS

| | | | |
|---|---|---|---|
| 3,681,264 | 8/1972 | Prial et al. | 252/8.05 |
| 3,839,425 | 10/1974 | Bartlett | 252/8.05 X |
| 4,038,195 | 7/1977 | Chiesa | 252/3 |

FOREIGN PATENT DOCUMENTS

| | | | |
|---|---|---|---|
| 1,223,701 | 8/1966 | Fed. Rep. of Germany | 252/8.05 |

*Primary Examiner*—Leland A. Sebastian

*Attorney, Agent, or Firm*—Lawrence Rosen; E. Janet Berry

[57] ABSTRACT

Concentrates suitable for making fire-fighting liquids upon sixteen-fold dilution are described comprising particular perfluoro ampholytic surfactants, solvents and fluorine-free surfactants. The ampholytic surfactants are of the general formula

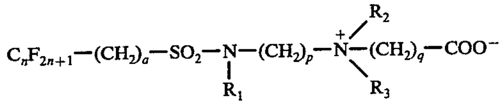

wherein $n$ represents an integer of from 1 to 20, $a$ represents an integer of from 2 to 10, $q$ represents an integer of from 0 to 10, $p$ represents an integer from 0 to 10 and each of $R_1$, $R_2$ and $R_3$, which may be the same or different, are hydrogen, $C_{1-6}$alkyl or $$C_nF_{2n+1}—(CH_2)_a—SO_2$$

The solvent is a glycol or glycol ether preferably butyldigol or butyl cellosolve. When the preferred fluorine-free surfactants are used the solutions obtainable on dilution will form a film on n-hexane. The concentrates contain less than 2% of the perfluoro surfactant.

27 Claims, No Drawings

FIRE-FIGHTING COMPOSITIONS

It is common practice to fight fires, and prevent ignition or re-ignition, especially on liquid hydrocarbon fuels, by applying to the burning or ignitable fuel a fire-fighting solution which has been obtained by diluting in situ an aqueous fire-fighting concentrate, generally by mixing one part of the concentrate with 16 parts water. The fire-fighting liquid may be applied to the fuel as a spray, for example through sprinklers, or more usually as a foam, using conventional foam making equipment. If the fire-fighting liquid is applied as a foam it must of course form a stable foam but it is also desirable that it should form a film over the fuel. If the fire-fighting liquid is supplied by, for instance, spray, then it is essential that it should form a film.

It is well known that various perfluoro surfactants can advantageously be included in fire-fighting concentrates and liquids either alone or in combination with other materials. In particular we have proposed in British Patent Specification No. 1,230,980 that it is advantageous to use one or more perfluoro surfactants in combination with one or more hydrocarbon surfactants, that is to say fluorine-free surfactants. We have now found that fire-fighting liquids of particularly desirable properties can be formulated if we use particular materials in such compositions.

In Specification No. 1,230,980 mixtures are described of perfluoro surfactant and various types of fluorine-free surfactants, in amounts that are generally below the amount of perfluoro surfactant and in one example a very small amount of nonionic cellulose ether is included.

In British Patent Specification No. 1,264,681 the use of a large number of combinations of various perfluoro surfactants with various fluorine-free surfactants is disclosed, and in most instances the amount of fluorine-free surfactant is less than the amount of perfluoro surfactant. In most instances also the concentration of perfluoro surfactant is 0.36%. Some examples having a concentration of 0.023% are quoted, but do not appear to be considered very satisfactory. Th fluorine-free surfactants tested include a wide range of nonionic, anionic and cationic materials. In British Patent Specification No. 1,270,661 there are disclosures of fire fighting liquids containing various perfluoro surfactants, including amphoteric surfactants. Fire fighting concentrates and liquids are also disclosed in British Patent Specification No. 1,415,400. In this the compositions are stated to contain a fluorine-free surfactant and two different perfluoro materials, one being an amphoteric surfactant and the other being an anionic surfactant. The total perfluoro content in the exemplified concentrate is 4.5% so that upon 16-fold dilution the concentration in the liquid is 0.28%.

Many other disclosures of the use of various types of perfluoro surfactants in fire-fighting compositions exist.

The product known as "Light Water" FC200 is probably the most widely used composition based on perfluoro and fluorine-free surfactants and is similar to that exemplified in Specification No. 1,415,400, i.e. containing a mixture of substantial amounts of different types of perfluoro surfactants in an amount in the concentrate of around 4.5% (and in the fire-fighting liquid itself of around 0.28%) together with a fluorine free surfactant. The perfluoro component is the most expensive component in the fire-fighting mixture and it would be desirable to be able to obtain good results using much lower quantities of it and to avoid having to use substantial amounts of different types of perfluoro surfactant. It would be desirable also to have a composition that not only was capable of giving a good foam but also had improved film-forming properties.

Naturally, the ability of any particular composition to form a film over a hydrocarbon liquid depends not only upon the components of that film but also upon the hydrocarbon liquid. The ability of any particular composition to form a film is commonly determined by measuring the spreading coefficient of the film on that liquid. If the spreading coefficient is a positive number then a film can be formed while if it is negative a film generally will not be formed. For standardisation purposes it has been common to determine the spreading coefficient on cyclohexane and in the past it has generally been considered adequate if a composition has a positive spreading coefficient on cyclohexane.

However the fact is that there are in commercial use various hydrocarbon fuels having a lower surface tension than cyclohexane, with the result that it is more difficult to form a film on them. Thus cyclohexane has a surface tension of about 26 dyne/cm but ordinary lead-free petrol has a surface tension of about 21 dyne/cm. Accordingly compositions judged to be satisfactorily film-forming on cyclohexane do not form a film in use on many fuels and so rely for their fire-fighting properties on their foam structure and not on their film forming properties. Accordingly it has been our objective to devise a fire-fighting composition that has improved film forming properties and preferably has a positive spreading coefficient, i.e. is film forming, on a fuel having a lower surface tension than cyclohexane, and in particular that has a positive spreading coefficient on n-hexane, which has a surface tension of about 18 dynes/cm. So far as we are aware there is no known fire-fighting foamable composition that is film forming on n-hexane.

Numerous perfluoro surfactants have been proposed in the literature since they are, as a class, known to be useful for various industrial purposes. Many of them will give some degree of foaming and film formation on some fuels when used in the manner described in, for instance, British Patent Specification No. 1,230,980. We have now found that it is possible to formulate liquids that are effective in fire-fighting even though they contain very much less perfluoro surfactant than has been needed previously in order to obtain effective results, that are capable of being applied as foams or by spray, and which have improved film forming properties, the preferred compositions being capable of forming a film on n-hexane.

A fire-fighting concentrate according to the invention comprises an aqueous solution of (a) less than 2% by weight of perfluoro surfactant, (b) 1 to 9 parts by weight per part perfluoro surfactant of a fluorine-free surfactant and (c) a glycol or a glycol ether solvent for the perfluoro surfactant, provided that the perfluoro surfactant is an amphoteric surfactant having the general formula 1

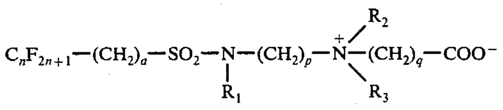

wherein $n$ represents an integer of from 1 to 20, $a$ represents an integer of from 2 to 10, $q$ represents an integer of from 0 to 10, represents an integer from 0 to 10 and each of $R_1$, $R_2$ and $R_3$, which may be the same or different, are hydrogen, $C_{1-6}$alkyl or $$C_nF_{2n+1}-(CH_2)_a-SO_2$$

Preferably $R_1$ is H or $C_{1-4}$ (usually $C_{1-3}$)alkyl and $R_2$ and $R_3$ are $C_{1-4}$ (usually $C_{1-3}$)alkyl; at least one being methyl.

These quaternised perfluoro sulphonamides are described in British Patent Specifications Nos. 1,343,990 and 1,346,644. Neither of these specifications suggests their use in fire fighting. Since making the invention we have become aware of the content of French Patent Specification No. 75 12981 which discloses fire-fighting liquids containing a mixture of substantial amounts of each of an ampholytic prefluoro surfactant, a nonionic perfluoro sufactant and a cationic perfluoro surfactant, the total amount of perfluoro surfactant being the typical amount, for instance 0.22% upwards. For instance in Example 1 the total amount is 0.5% and the amount of amphoteric surfactant is about 0.3%. There is no disclosure in this specification of a composition containing hydrocarbon surfactant and a glycol or glycol ether solvent and there is no suggestion that the compositions are capable of forming films on hexane. Accordingly there is no realisation in this specification that it is possible to formulate a composition in accordance with our invention having the low perfluoro concentration, and therefore relatively low cost, combined with the technical advantages of the compositions of the invention.

It is essential in the invention to use 1 to 9 parts by weight, per part perfluoro surfactant, of a fluorine-free surfactant that may instead be called a hydrocarbon surfactant in that it is free of halogen. The choice of fluorine free surfactant has an important effect on the properties of the composition. While a variety of anionic, ampholytic and non ionic surfactants will give compositions that have satisfactory foaming, fire resistance and film forming properties (by conventional standards) at the remarkably low concentration of perfluoro surfactant used in the invention the best properties, especially as regards film forming is obtained if a non ionic surfactant or an anionic phosphate ester surfactant is used and accordingly these are preferred as the sole or major component of the fluorine free surfactant.

The non-ionic surfactant is preferably an ethylene oxide propylene oxide block copolymer such as is sold under the trade name "Pluronic" or more preferably, an alkoxylate of an aliphatic alcohol containing at least 12 carbon atoms or an alkoxylate of an alkyl phenol. The alkoxylates are in each instance preferably ethoxylates and they preferably each contain at least 7 ethoxy groups, most usually at least 8 or at least 10 ethoxy groups. Suitable ethoxylates of aliphatic alcohols are ethoxylates of alcohols having a $C_{13}$ or $C_{15}$ chain or of tridecanol or oleyl alcohol. The alkyl groups in alkyl phenol ethoxylates are preferably octyl or nonyl groups. Such compounds preferably contain at least 6 ethoxy groups and usually at least 10 ethoxy groups. Preferred surfactants have a cloud point for a 1% solution in water of between 30 and 100° C, most preferably between 60 and 80° C.

The preferred compositions of the invention are those that have such good film forming properties that they will give a film on n-hexane at the low concentrations of perfluoro surfactant used in the invention (less than 2% in the concentrate or less than 0.13% in the liquid). Preferred surfactants are selected from octyl phenyl condensates with 8 to 40, preferably 8 to 12 or about 30, most preferably 10 or 11, moles ethylene oxide, nonyl phenyl condensates with 8 to 40, preferably 8 to 14, most preferably 10 or 11, moles ethylene oxide, phosphate esters that are foam forming and are obtained by phosphorlyating ethylene oxide condensates such as these, and condensates of tridecanol with 7 to 10 moles ethylene oxide, since compositions with these have the unique property of being film forming on n-hexane.

We have found surprisingly that the stability of the foam can be synergistically improved by including also a fatty alkanolamide, as part of the fluorine free surfactant. The fatty group is preferably a $C_{12}$ to $C_{18}$ aliphatic group and the alkanol-amide group is preferably an ethanolamide group. These compounds act synergistically with the other surfactants to stabilise the foam. Preferred stabilisers are coconut, lauric or oleic diethanolamides. The amount can be from 1 to 30% by weight based on the weight of the main nonfluoro surfactant but is generally 5 to 10%, preferably around 8%. They have the best synergistic effect with the preferred non ionic surfactants listed above.

There should always be at least as much nonfluoro surfactant as perfluoro surfactant, in contradistinction to most of the compositions of the prior art wherein the amount of fluorine-free surfactant is less than the amount of perfluoro surfactant, with consequential extra cost. Best results are generally obtained when the amount of fluorine-free surfactant is from 1 to 4 parts, most preferably 2 to 4 parts, per part by weight perfluoro surfactant. In some instances the optimum amount is 2 parts while in others it is 3 parts, depending upon the intended use and the other components of the mixture.

The use of a glycol or glycol ether solvent is essential in the invention since if such a material is not present adequate foam formation and film formation will not be achieved. The glycol or glycol ether must be one that is a solvent for the perfluoro surfactant, that is to say it must not precipitate the perfluoro surfactant from solution in the concentrate or liquid or foam but instead should assist in its dissolution. The solvent can also have significant effect upon foam formation and different solvents can result in different degrees of foam formation. Since it is preferred that compositions of the invention should be both good film formers and good foamers solvents that aid foam formation are therefore preferred, these being butyldigol ($C_4H_9-(OC_2H_4)_2-OH$) and butyl cellosolve ($C_4H_9-OC_2H_4-OH$).

The amount of solvent that gives the best positive spreading coefficient on n-hexane and other properties in the foam can be found by experimentation but is generally between 10 to 20 and 30%, preferably 15 to 25% e.g. 18% weight % based on the volume of the concentrate. It is surprising that with these amounts good results are achieved since in most of the prior specifications either no solvent is used or more solvent is used.

All compositions of the invention preferably have a pH, in the concentrate, of 4 to 11; the best results are obtained when the pH is from 7.5 to 8.5, especially around 8.0.

Naturally the optimum results in any particular composition depend upon the particular perfluoro surfactant that is being used, and the values of $n$, $a$, $p$, $q$, $R_1$, $R_2$ and $R_3$ must be so chosen that the compound is effective in the particular composition, e.g. with the particular solvent, being used. For instance, if the molecular weight of the compound is too high the preferred solvents may be incapable of solubilising it sufficiently.

Generally it is best for *n* to be 4 to 10. Preferably *n* is 4 to 10, *a* is 2 to 4, *p* is 1 to 6, and *q* is 1 to 10 and $R_1$, $R_2$ and $R_3$ are preferably each selected from hydrogen, methyl, ethyl or a propyl group. The most useful perfluoro surfactants are those in which *n* is 6, 8 or 10, (preferably 6), *a* is 2 or 4, *p* is 2 or 3, *q* is 2,3 or 4 and $R_2$ and $R_3$ are both methyl. Preferably $R_1$ is hydrogen or methyl. Particularly useful are the compounds in which *n* is 6 and *a, p* and *q* are each 2, $R_2$ and $R_3$ are both methyl and $R_1$ is hydrogen or methyl, especially hydrogen. Also, very useful are compounds in which *n* is 6, *a* and *p* are both 2 and *q* is 3, and $R_2$ and $R_3$ are both methyl. Naturally not all compounds within formula 1 give equivalent results but routine experiments will readily shown which are best.

Preferably the perfluoro surfactant consists solely of a compound of formula I, optionally with a minor amount (e.g. up to 30%, preferably 20% of total perfluoro surfactant) or other perfluoro compound.

The material that we prefer to use is that which is a commercial product sold by Ugine Kuhlmann, the Patentee of 1,343,990, under the trade name "Forafac 1157", "Forafac" being a registered Trade Mark.

An important feature of the invention is that the amount of perfluoro surfactant used, that is to say the pure compound of formula 1 or the mixture of compound of formula 1 with other perfluoro compounds, is lower than has been used successfully in any prior concentrate. Thus it is always less than 2% and is generally from 1 to 1.5%. The minimum amount can be found by routine experimentation but is usually not less than 0.5%.

The concentrates of the invention preferably consist solely of the ampholytic perfluoro surfactant the fluorine-free surfactant including optionally the small amount of synergistic surfactants such as fatty alkanolamide and the solvent. However other additives may be included if desired. It may even be possible to include proteinaceous foam forming liquid in the concentrate so as to obtain a perfluoro-containing protein foam.

Although it is desirable that the concentrate should be formulated using distilled or deionised water an advantage of the invention is that dilution of the concentrate can be with distilled, deionised, tap or sea water. The concentrate is normally subjected to 16 fold dilution in order to form the fire-fighting liquid, which may be foamed, i.e. 6 parts of the concentrate are mixed with 94 parts water.

Accordingly the concentration in the fire-fighting liquid of the perfluoro component is below 0.13%, preferably 0.05 to 0.1%, and of the solvent is from 0.6 or 1.2 to 2%.

The following are Examples of two concentrates according to the invention. In each of the these the ethyl alcohol is present because the "Forafac 1157" is supplied as a solution in alcohol. Each concentrate has a pH of 8.0. All percentages are by weight unless otherwise specified.

EXAMPLE 1

| | |
|---|---|
| Forafac 1157 | 1.2% |
| Triton X-100 | 3.6% |

-continued

| | |
|---|---|
| Butyldigol | 25.0% |
| Ethyl alcohol | 2.6% |
| Distilled Water | 67.6% |

EXAMPLE 2

| | |
|---|---|
| Forafac 1157 | 1.2% |
| Triton X-100 | 2.4% |
| Detergyl EDC | 0.2% |
| Butyldigol | 18.0% |
| Ethyl alcohol | 1.4% |
| Distilled Water | to 100% |

"Triton X-100" is a trade mark for octylphenol ethylene oxide condensate containing 10 ethylene oxide groups e.e. $C_8H_{17}C_6H_4(OC_2H_4)_{10}.OH$. "Synperonic OP10" is a trade mark for a chemically similar material which may be used equally effectively. "Detergyl EDC" is a trade mark for coconut diethanolamide.

EXAMPLES 3 and 4

The concentrates of Examples 1 and 2 were diluted to as 6% fire-fighting solutions and each was applied in conventional manner by a 50 gallon/minute foam making branch pipe to a fire of 1000 square feet area made by burning 300 gallons of AVGAS for 30 seconds. 90% control was achieved in 30 seconds and extinction in 60 seconds. Each was tested for burnback resistance to the British Ministry of Defence standard on AVGAS and AVTUR. The actual burnback time and the minimum acceptable burnback time under the Standard are as follows:

| Fuel | Example 3 | Example 4 | Min.Acceptance |
|---|---|---|---|
| AVGAS | 8' 58" | 13' 22" | 5' |
| AVTUR | 22' 53" | 25' 25" | 10' |

This shows that the concentrate of Example 1 is very satisfactory, but the concentrate of Example 2 is even better.

Fire-fighting solutions obtained in each of Examples 3 and 4 were found to have a positive spreading coefficient on n-hexane, that is to say they were capable of forming a film on n-hexane.

EXAMPLE 5

Solutions with various combinations of "Forafac 1157" "Triton X-100" and "Butyldigol" were discharged as a foam from a standard 2 gallon foam type fire extinguisher and the foam expansion was noted. The results are given in the following Table:

| Forafac 1157 | Triton X-100 | Butyldigol | Expansion |
|---|---|---|---|
| 0.1 | — | — | 1 |
| 0.1 | — | 1.5 | 4 |
| 0.1 | 0.2 | 1.5 | 8 |
| — | 0.2 | 1.5 | 7 |
| 0.1 | 0.2 | — | 2 |

EXAMPLE 6

The film forming properties of various fire-fighting solutions, including solutions according to the invention, on n-hexane were determined. In each instance the fire-fighting solution was prepared and was added dropwise to n-hexane contained in a small evaporating dish.

Each solution was prepared by dissolving in water 0.07% "Forafac 1157", 1.5% Butyldigol and 0.22% of the fluorine free surfactant.

The surfactants used, given by both their trade name and their chemical description, were the following:

| | |
|---|---|
| Alcopol FA | Long chain sulphosuccinamate |
| Alcopol FL | Long chain sulphosuccinamate derivative |
| Maprosyl 30 | Sodium lauroyl sarcosinate |
| Nansa SS30 | Dodecyl benzene sulphonate |
| Manoxol OT | Sodium di-octyl sulphosuccinate |
| Ammonyx LO | Dimethylauryl amine N-oxide |
| Triton XQS-20 | Phosphate ester of ethylene oxide condensate of alkyl phenyl |
| Volpo T7 | Ethoxylate based on tridecanol reacted with 7 moles of ethylene oxide. |
| Synperonic A7 % A11 | Ethoxylate based on 67% C13 alcohols and 33% C15 alcohols reacted with 7 and 11 moles respectively of ethylene oxide. |
| Synperonic NP13 & NP15 | Ethoxylate of nonylphenol reacted with 13 and 15 moles respectively of ethylene oxide. |
| Synperonic OP10 & OP11 | Ethoxylate of octylphenol reacted with 10 and 11 moles respectively of ethylene oxide. |
| Triton X-100 | Ethoxylate of octylphenol reacted with 10 moles ethylene oxide. |
| Triton X-305 | Ethoxylate of octylphenol reacted with 30 moles ethylene oxide. |

All the compositions had film-forming ability on cyclohexane but only the compositions containing Triton XQS 20 and non ionic surfactants had any tendency to form a film on n-hexane, i.e. they either formed a film or formed lenses, that is to say the liquid spread over the n-hexane to some extent but insufficiently to form a complete film from the small amount that was applied. Of these, the compositions that had best film forming ability on n-hexane were Synperonic OP10, OP11 and NP13, Volpo T7, Triton X305 and Triton XQS 20.

EXAMPLE 7

The fire-fighting solutions tested in Example 6, were made into a foam by shaking 100 mls (when form formation was being recorded) or 150 mls (when fire performance was being treated) in a 900 mls cylinder. The expansion was recorded as in Example 5 and the fire performance was tested by applying 90 mls of an expansion 6.0 foam to n-hexane fires of various areas. The fire preburn time was 35 seconds and the maximum tray area that the foam could extinguish was noted for each formulation. The fuel depth was 1 cm in all tests. If a formulation passed the largest tray (238 sq.cm.) the test was made more severe by applying only 75 mls of foam.

| Surfactant | Expansion | Maximum fire area extinguished (sq.cm.) |
|---|---|---|
| Alcopol FA | 7.8 | 97 |
| Alcopol FL | 9.0 | 145 |
| Nansa SS30 | 9.0 | 97 |
| Manoxol OT | 3.0 | not attempted |
| Maprosyl 30 | 4.0 | not attempted |
| Triton XQS-20 | 8.0 | 238 |
| Ammonyx LO | 8.0 | 120 |
| Synperonic All | 7.1 | 181 |
| Synperonic A7 | 6.0 | 238 |
| Synperonic OP10 | 7.8 | 238 (75 mls foam) |
| Synperonic NP15 | 7.8 | 238 |
| Triton X-305 | 7.9 | 181 |
| Volpo T7 | 7.6 | 181 |

The results in Examples 5 and 6 show that the condensate of octylphenol with 10 moles ethylene oxide gives the optimum combination of expansion, fire extinguishing results and film formation. The other nonionic surfactants also give useful foam formation and fire extinguishing properties of the foam and have the advantage that they also give good film formation. Of the surfactants other than nonionics, the only one that gives a reasonable or good combination of film-formation, expansion and fire extinguishing properties of the foam is Triton XQS-20, but this is an acidic compound and can induce precipitation by ions such as calcium and creates handling problems.

EXAMPLE 8

Fire-fighting solutions were formulated containing 0.22% Triton X100, 0.07% "Forafac 1157" and 1.5% of various glycols and glycol ethers. The resulting composition was subjected to foaming and the expansion was measured and it was observed whether or not the "Forafac 1157" was precipitated. The occurrence of precipitation shows that the material being tested was not a solvent. The results are as follows:

| Solvent | Expansion | Precipitation of "Forafac 1157" |
|---|---|---|
| Hexylene glycol | 6.8 | no |
| Ethyldigol | 5.0 | yes |
| Trigol | 4.8 | yes |
| Ethylene glycol | 4.6 | yes |
| Butyl cellosolve | 8.0 | no |
| Methyl cellosolve | 5.5 | no |
| Methyl diglyme | 4.2 | no |
| Butyldigol | 8.0 | no |

These show that butyl cellosolve and butyl digol give the best expansion and upon subjecting the foams based on these to the fire test described above they were found to give substantially equivalent results. However butyl cellosolve is more toxic and has a lower flash point and so butyl digol is preferred.

EXAMPLE 9

In this Example various perfluoro surfactants other than those used in the invention were tested for film formation and foaming properties.

The commercially available material FC200 (which is believed to contain about 4.5% perfluoro material and to be in accordance with the Example in British Patent Specification No. 1,415,400) was diluted 16 fold and the resultant solution was found to form a film rapidly on cyclohexane but did not form a film on n-hexane. This solution did, however, form a good foam having good fire extinguishing properties. When it was diluted 40 fold, so as to produce a solution containing 0.11% perfluoro material, the film formation, foam formation and fire extinguishing properties were greatly inferior to those of the compositions of Examples 1 and 2.

Similarly compositions were prepared containing 4% or more of various other perfluoro surfactants, such as those listed in British Patent Specification No. 1,070,289 and those that are commercially available and that are disclosed in British Patent Specifications Nos. 1,230,980, 1,264,681 and 1,270,661. It was found impossible, regardless of variations in fluorine-free surfactant and solvent, to obtain concentrates that, upon 16 fold dilution, gave solutions that had any film-forming properties on n-hexane or that would give such satisfactory fire-fighting foams as those obtained in Examples 1 and 2. When each of these concentrates was diluted still further, so that the perfluoro content was about 0.1%, the results were even worse.

We claim:

1. A fire fighting concentrate comprising an aqueous solution of (a) less than 2% by weight of perfluoro surfactant, (b) from 1 to 9 parts by weight, per part by weight perfluoro surfactant, of a fluorine-free surfactant, and (c) glycol or glycol ether solvent for the perfluoro surfactant, and in which the perfluoro surfactant comprises an ampholytic fluorinated sulphonamide having the general formula

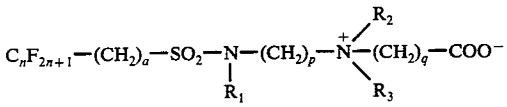

wherein $n$ represents an integer of from 1 to 20, $a$ represents an integer of from 2 to 10, $q$ represents an integer of from 0 to 10, $p$ represents an integer from 0 to 10 and each of $R_1$, $R_2$ and $R_3$, which they be the same or different, are hydrogen, $C_{1-6}$alkyl or $C_nF_{2n+1}$—$(CH_2)_a$—$SO_2$ 2. A concentrate according to claim 1 containing from 1 to 1.5% perfluoro surfactant, about 2 to 4 parts, per part perfluoro surfactant, of the fluorine-free surfactant, and about 20 to 30% of the solvent.

3. A concentrate according to claim 1 in which the solvent is selected from butyl digol and $C_4H_9$—$OC_2H_4$—OH.

4. A concentrate according to claim 1 in which the fluorine-free surfactant is nonionic.

5. A concentrate according to claim 1 in which the surfactant is an alkylphenyl ethoxylate containing at least 8 ethoxy groups.

6. A concentrate according to claim 5 in which the nonionic surfactant is an octylphenol ethoxylate containing 10 ethoxy groups.

7. A concentrate according to claim 1 in which the amount of the fluorine-free surfactant is from 1 to 4 parts per part by weight perfluoro surfactant.

8. A concentrate according to claim 1 having a pH of from 7.5 to 8.5.

9. A concentrate according to claim 1 in which the amount of glycol or glycol ether solvent is from 15 to 25%.

10. A concentrate according to claim 1 in which up to 30% of the fluorine-free surfactant is a fatty alkanolamide 11. A concentrate according to claim 10 containing 5 to 10% based on the fluorine-free surfactant of coconut, lauric or oleic diethanolamide.

12. A concentrate according to claim 1 in which the fluorine-free surfactant is selected from alkoxylates of aliphatic alcohols containing at least 12 carbon atoms, alkoxylates of alkyl phenols, and phosphate esters.

13. A concentrate according to claim 12 in which the fluorine-free surfactant is selected from octylphenyl condensates with 8 to 40 moles ethylene oxide, nonylphenyl condensates with 8 to 15 moles ethylene oxide, tridecanol condensates with 7 to 10 moles ethylene oxide and phosphate ester foaming surfactants.

14. A concentrate according to claim 13 in which the fluorine-free surfactant is a condensate of 10 moles ethylene oxide with octylphenol.

15. A concentrate according to claim 1 containing from 1 to 1.5% by weight of perfluoro surfactant, from 1 to 4 parts by weight, per part perfluoro surfactant, of an octylphenol or nonylphenol ethoxylate containing at least 10 to 11 ethoxy groups, from 15 to 25% by weight of butyl digol, and from 1 to 30%, based on the weight of fluorine-free surfactant, of coconut, lauric or oleic diethanolamide.

16. A concentrate according to claim 1 in which $R_1$ is selected from hydrogen $C_{1-6}$alkyl and $C_nF_{2n}(CH_2)_aSO_2$—, and $R_2$ and $R_3$ are selected from $C_{1-3}$alkyl, at least one of $R_2$ and $R_3$ being methyl.

17. A concentrate according to claim 1 in which $n$ is 4 to 10, $a$ is 2 to 4, $p$ is 1 to 6, $q$ is 1 to 10 and $R_1$ is selected from hydrogen, and $C_{1-4}$alkyl groups and $R_2$ and $R_3$ are selected from $C_{1-4}$alkyl groups.

18. A concentrate according to claim 17 in which $n$ is 6, 8 or 10, $a$ is 2 or 4, $p$ is 2 or 3, $q$ is 2,3 or 4, $R_1$ is hydrogen or methyl and $R_2$ and $R_3$ are both methyl.

19. A concentrate according to claim 18 in which $R_1$ is hydrogen or methyl.

20. A concentrate according to claim 19 in which $R_1$ is hydrogen.

21. A concentrate according to claim 1 in which $n$ is 6, $a$, $p$ and $q$ are each 2 and $R_2$ and $R_3$ are each methyl.

22. A concentrate according to claim 1 in which $n$ is 6, $a$ and $p$ are both 2 and $q$ is 3 and $R_2$ and $R_3$ are both methyl.

23. A concentrate according to claim 1 in which the perfluorosurfactant is a mixture of at least 70% of a compound of formula I with another perfluoro compound.

24. A fire-fighting solution made by mixing one part of a concentrate according to claim 1 with about 16 parts water.

25. A fire-fighting solution comprising (a) less than 0.13% by weight of perfluoro surfactant, from 1 to 9 parts by weight, per part perfluoro surfactant, of fluorine-free surfactant, and (c) a glycol or glycol ether solvent for the perfluoro surfactant, in which the perfluoro surfactant comprises an amphoteric fluorinated sulphonamide of the general formula

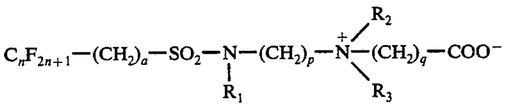

wherein $n$ represents an integer of from 1 to 20, $a$ represents an integer of from 2 to 10, $q$ represents an integer of from 2 to 10, $p$ represents an integer from 0 to 10 and each of $R_1$, $R_2$ and $R_3$, which may be the same or different, are hydrogen, $C_{1-6}$alkyl or $C_nF_{2n+1}$—$(CH_2)_a$—$SO_2$ and the solution has a positive spreading coefficient or n-hexane.

26. A method of fighting a hydrocarbon fire comprising applying to the hydrocarbon a fire-fighting liquid according to claim 24.

27. A method of fighting a hydrocarbon fire comprising applying to the hydrocarbon a fire-fighting liquid according to claim 25.

* * * * *